United States Patent
Ohashi et al.

(10) Patent No.: US 12,217,437 B2
(45) Date of Patent: Feb. 4, 2025

(54) OBSTACLE DETECTION DEVICE

(71) Applicant: Faurecia Clarion Electronics Co., Ltd., Saitama (JP)

(72) Inventors: Akira Ohashi, Saitama (JP); Daisuke Fukuda, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 428 days.

(21) Appl. No.: 17/792,578

(22) PCT Filed: Aug. 17, 2020

(86) PCT No.: PCT/JP2020/031002
§ 371 (c)(1),
(2) Date: Jul. 13, 2022

(87) PCT Pub. No.: WO2021/149288
PCT Pub. Date: Jul. 29, 2021

(65) Prior Publication Data
US 2023/0079994 A1    Mar. 16, 2023

(30) Foreign Application Priority Data
Jan. 20, 2020  (JP) .................................. 2020-007056

(51) Int. Cl.
*G06T 7/246* (2017.01)
*G06T 3/12* (2024.01)
(Continued)

(52) U.S. Cl.
CPC .............. *G06T 7/246* (2017.01); *G06T 3/12* (2024.01); *G08G 1/166* (2013.01); *G06T 2207/30261* (2013.01); *G08G 1/0175* (2013.01)

(58) Field of Classification Search
None
See application file for complete search history.

(56) References Cited

U.S. PATENT DOCUMENTS

| | | | |
|---|---|---|---|
| 6,246,961 B1* | 6/2001 | Sasaki ................ | B60W 30/095 701/28 |
| 2010/0315505 A1* | 12/2010 | Michalke .............. | G06T 7/251 348/118 |

(Continued)

FOREIGN PATENT DOCUMENTS

| JP | 2002-373332 A | 12/2002 |
|---|---|---|
| JP | 2010-093610 A | 4/2010 |

OTHER PUBLICATIONS

International Search Report from corresponding International Application No. PCT/JP2020/031002, dated Oct. 20, 2020, 4 pages.

*Primary Examiner* — Haris Sabah
(74) *Attorney, Agent, or Firm* — Tucker Ellis LLP

(57) ABSTRACT

An obstacle detecting device includes: an image converting portion for converting, into a circular cylindrical image, an image captured by a camera installed on a vehicle; a detection subject candidate image detecting portion for detecting a detection subject candidate image through pattern matching; an optical flow calculating portion for calculating an optical flow; an outlier removing portion for removing an optical flow that is not a detection subject; a TTC calculating portion for calculating a TTC (TTCX, TTCY); a tracking portion for generating a region of the detection subject on the circular cylindrical image by tracking the detection subject candidate; and a collision evaluating portion for evaluating whether or not there is the risk of a collision, wherein the optical flow calculating portion calculates the optical flow based on the detection subject candidate image and the region.

6 Claims, 14 Drawing Sheets

(51) Int. Cl.
    *G08G 1/16*       (2006.01)
    *G08G 1/017*    (2006.01)

(56) References Cited

U.S. PATENT DOCUMENTS

| | | | |
|---|---|---|---|
| 2012/0314071 A1* | 12/2012 | Rosenbaum | G06T 7/269 |
| | | | 348/148 |
| 2014/0037138 A1 | 2/2014 | Sato et al. | |
| 2014/0038138 A1* | 2/2014 | Swiderski | E02F 9/2008 |
| | | | 434/69 |
| 2015/0143913 A1* | 5/2015 | Adams | G06V 20/52 |
| | | | 382/104 |
| 2017/0140229 A1 | 5/2017 | Ogata et al. | |

* cited by examiner

[FIG. 1]
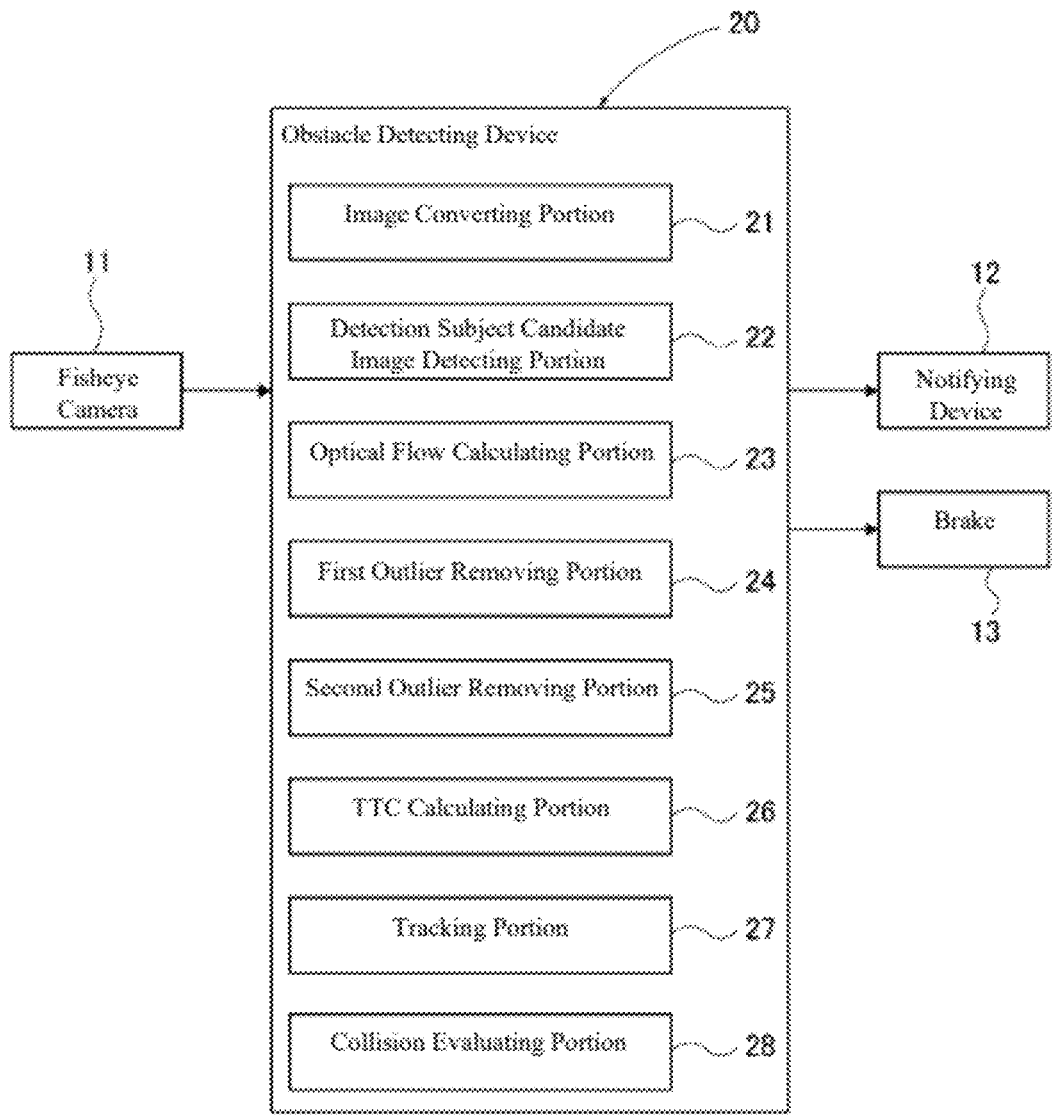

[FIG. 2A]
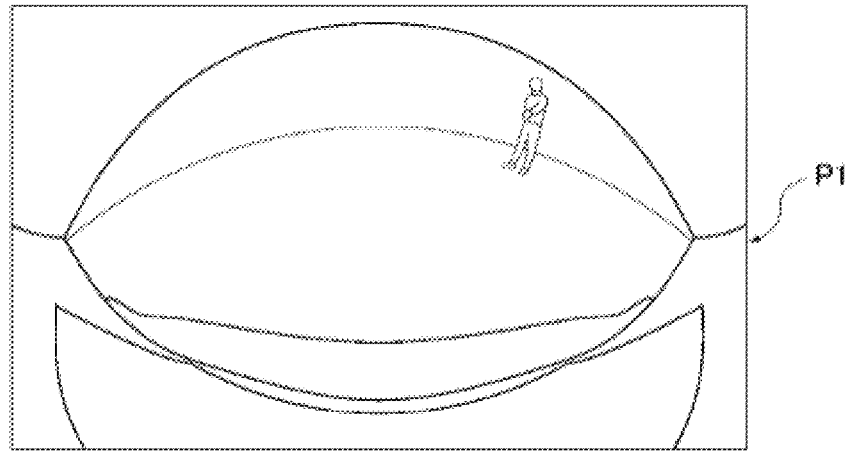
[FIG. 2B]
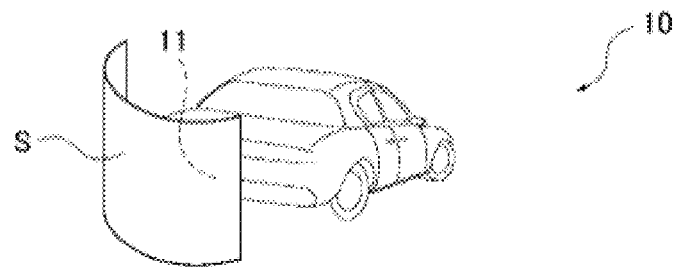
[FIG. 2C]
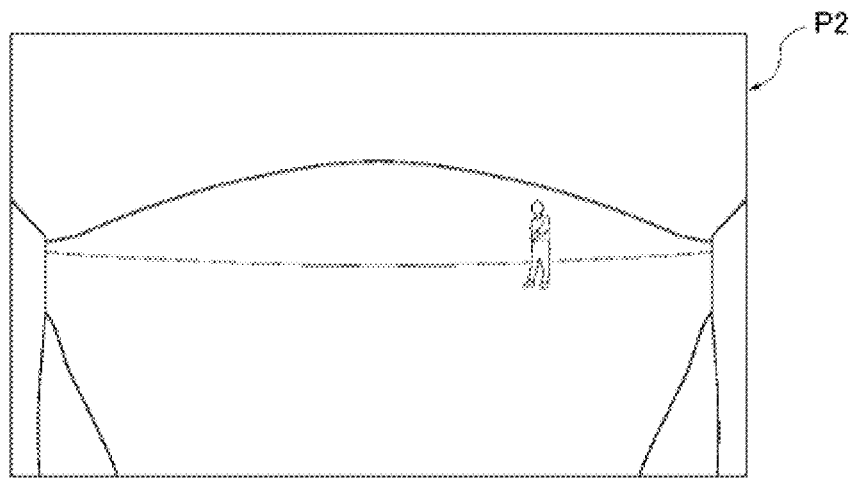

[FIG. 3]
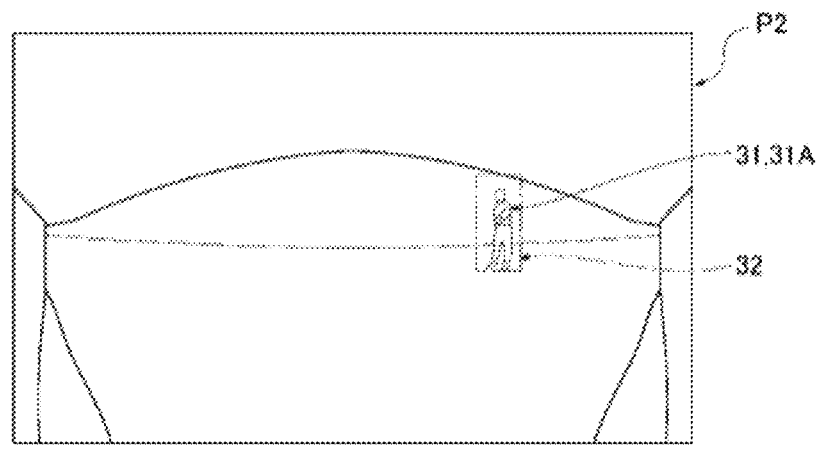
[FIG. 4A]
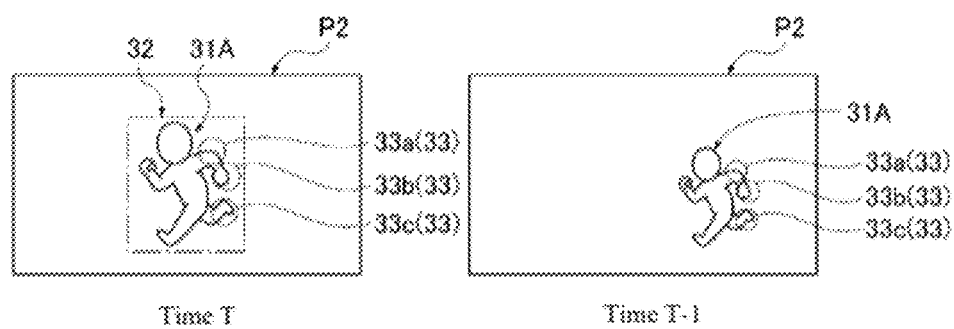
[FIG. 4B]
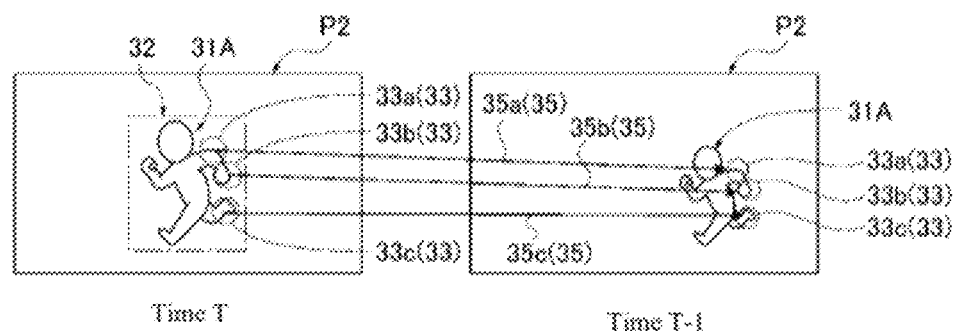

[FIG. 5]

| No. | Pattern Matching (Time T) | Tracking (T-1 → T) | Optical Flow Calculation Direction | Feature Points Extraction Range |
|---|---|---|---|---|
| 1 | O | O | T→T-1 | The union of the following ranges:<br>· Pattern Matching Rectangle (T)<br>· Prediction Rectangle (T) |
| 2 | O | X | T→T-1 | · Pattern Matching Rectangle (T) |
| 3 | X | O | T-1→T | · Tracking Rectangle (T-1) |
| 4 | X | X | No Process | |

[FIG. 6]
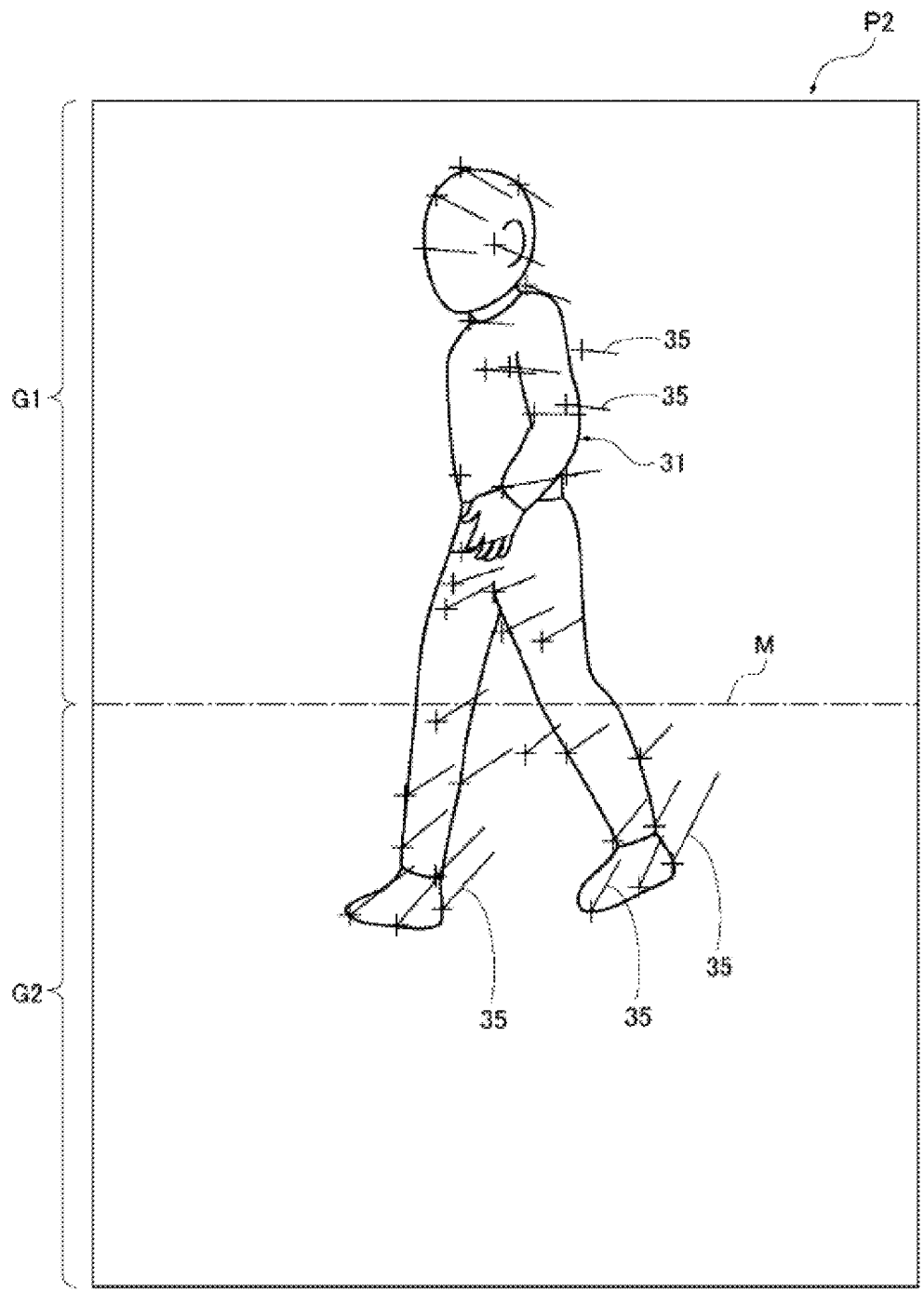

[FIG. 7]
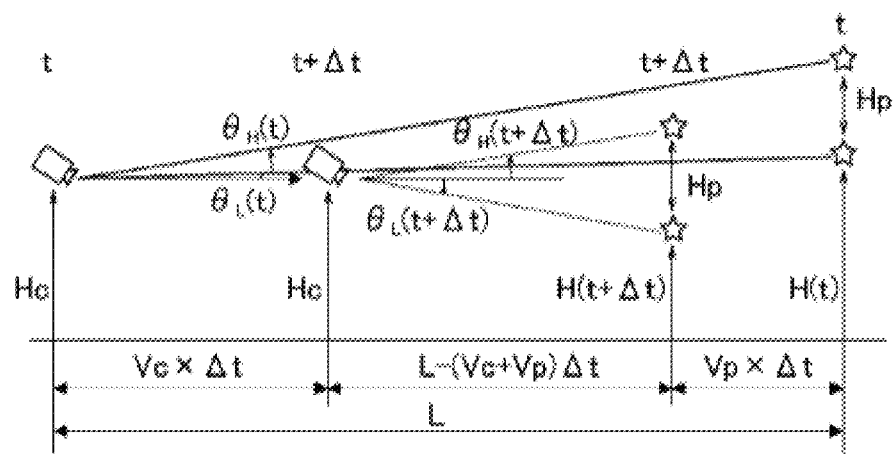
[FIG. 8]
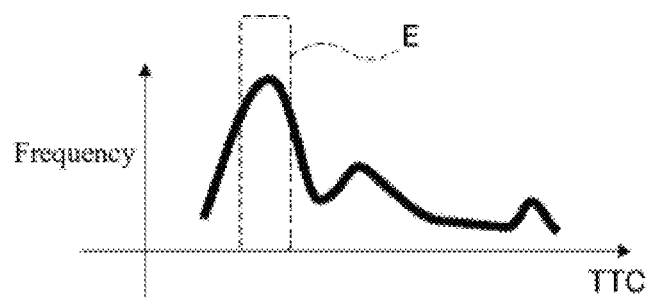

[FIG. 9]
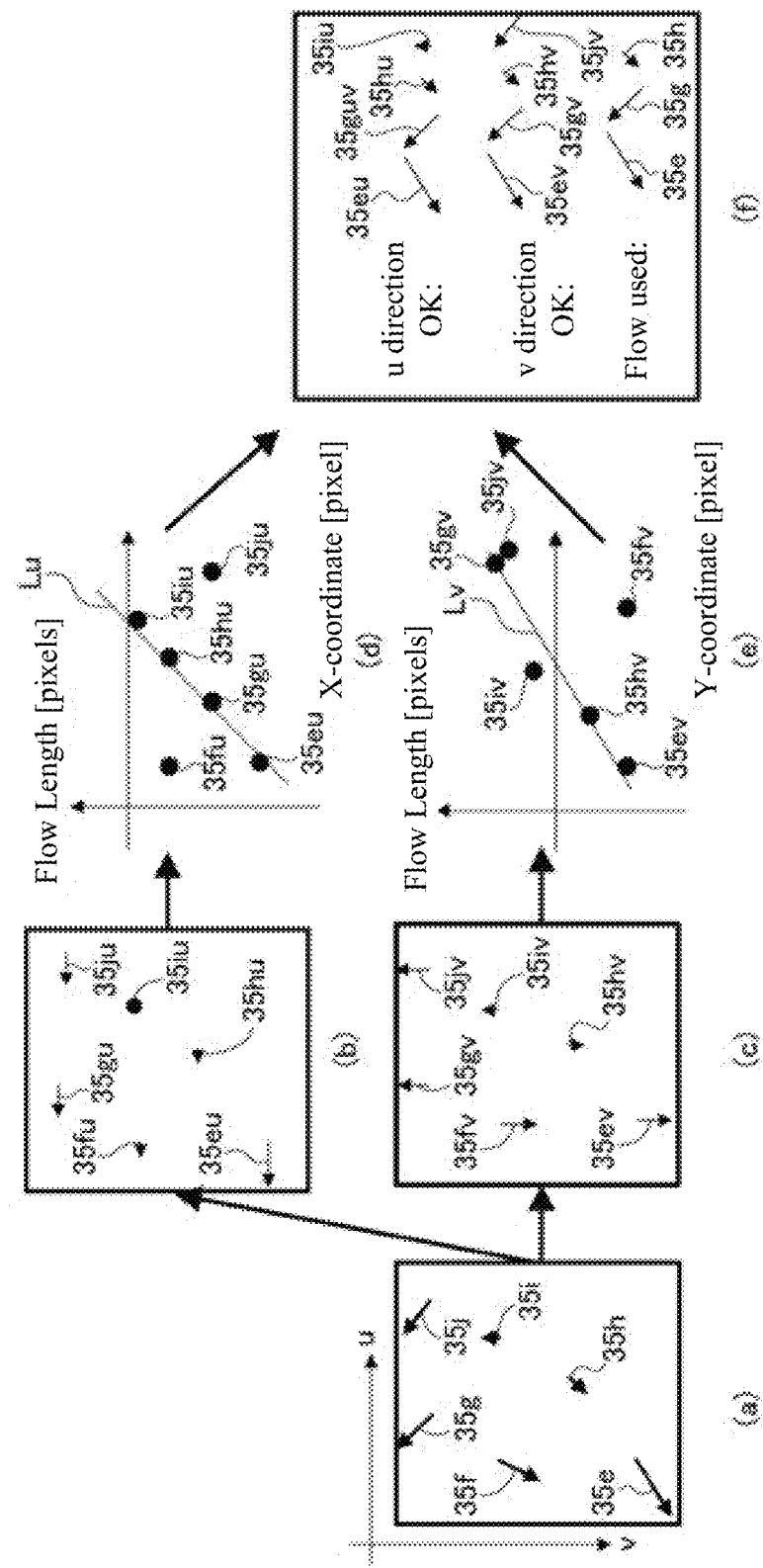

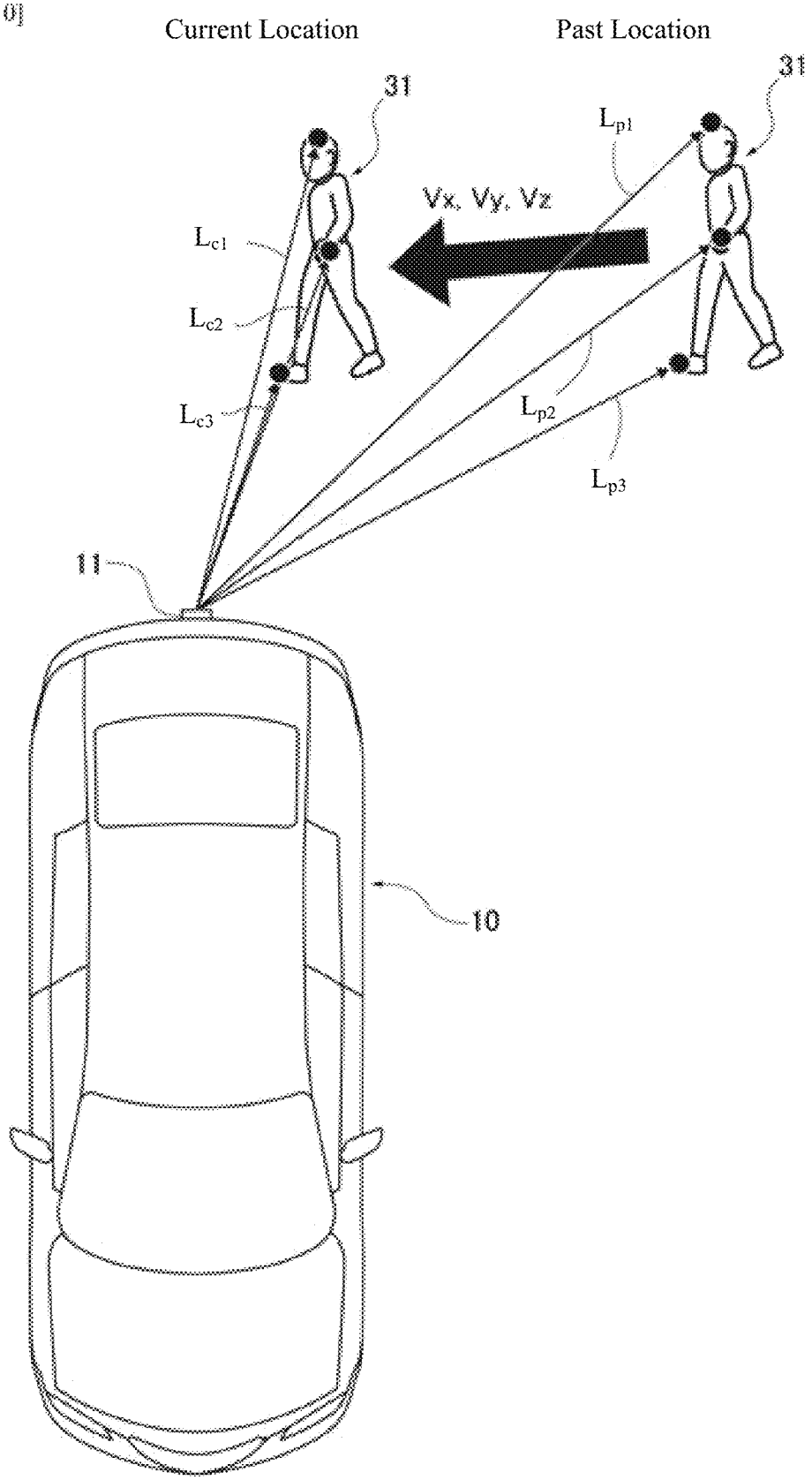

[FIG. 11A]
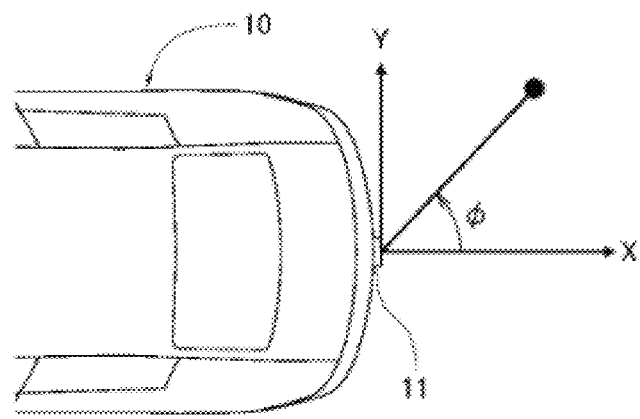
[FIG. 11B]
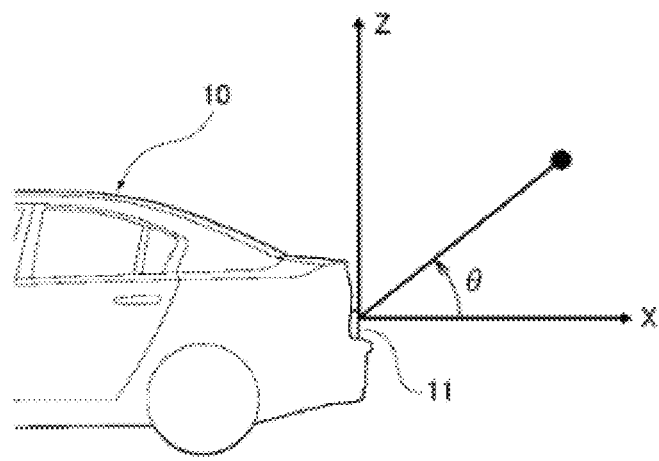

[FIG. 12]
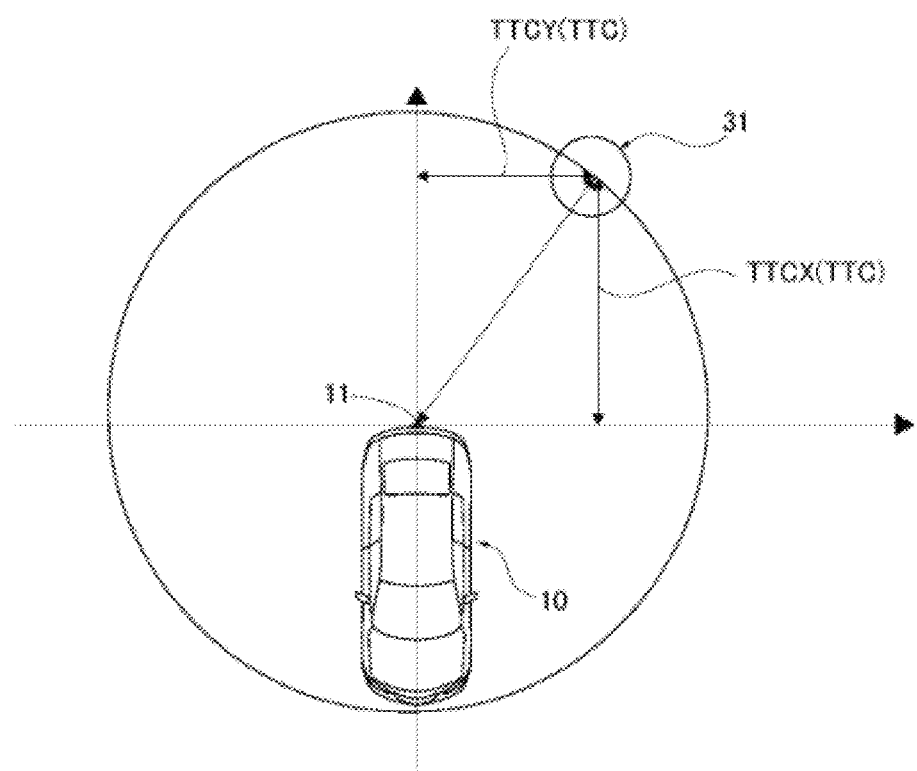

[FIG. 13]
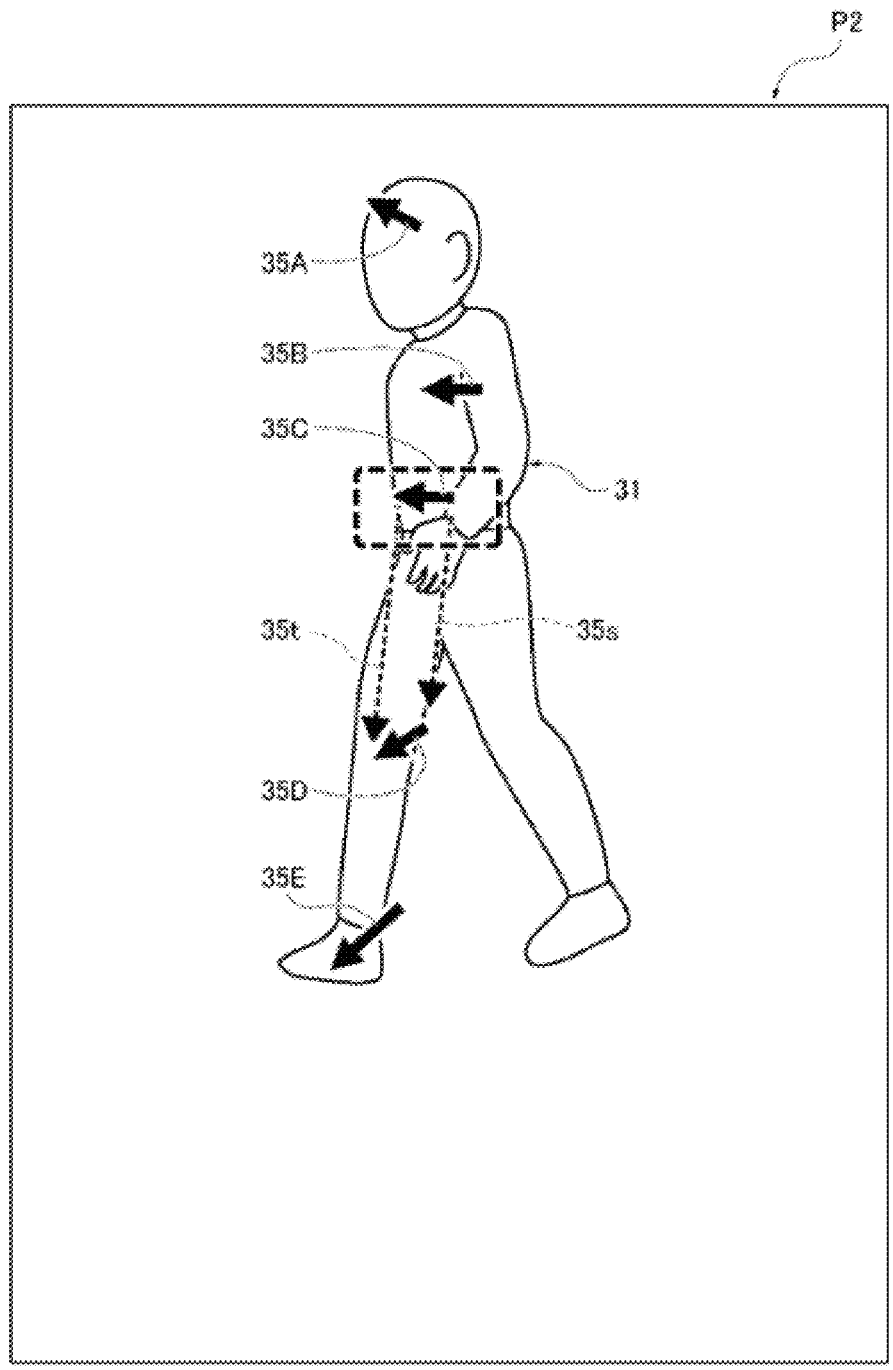

[FIG. 14]
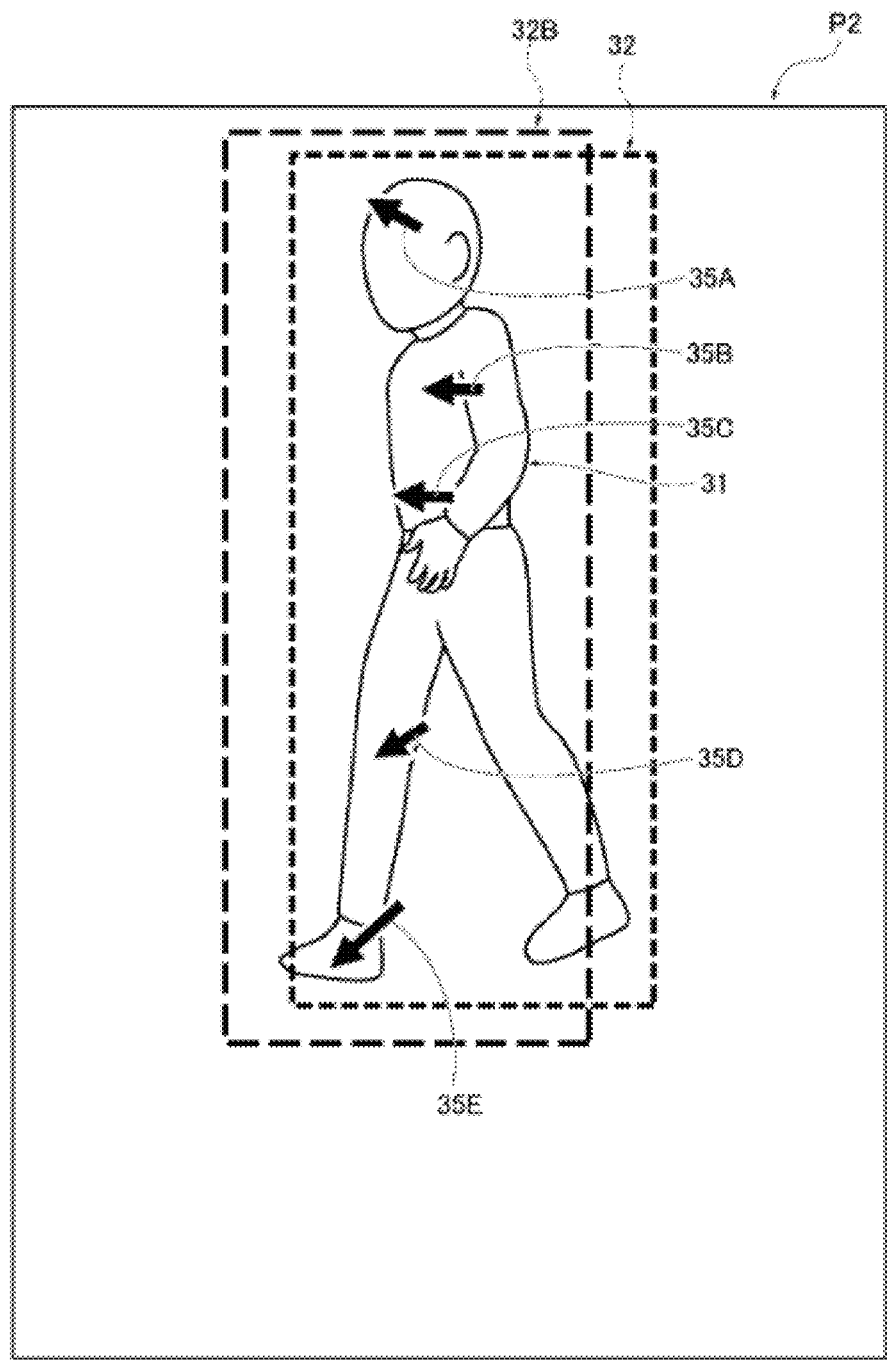

[FIG. 15]
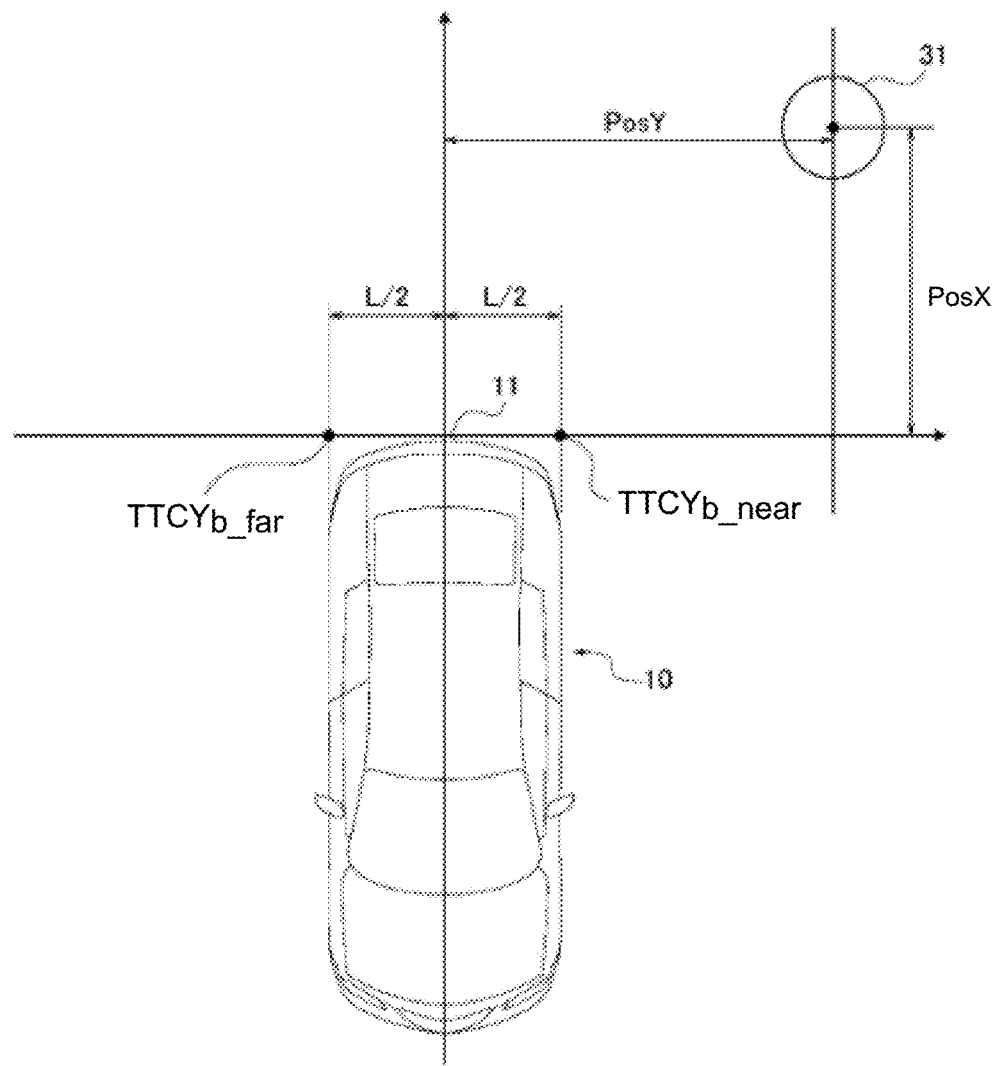

[FIG. 16]
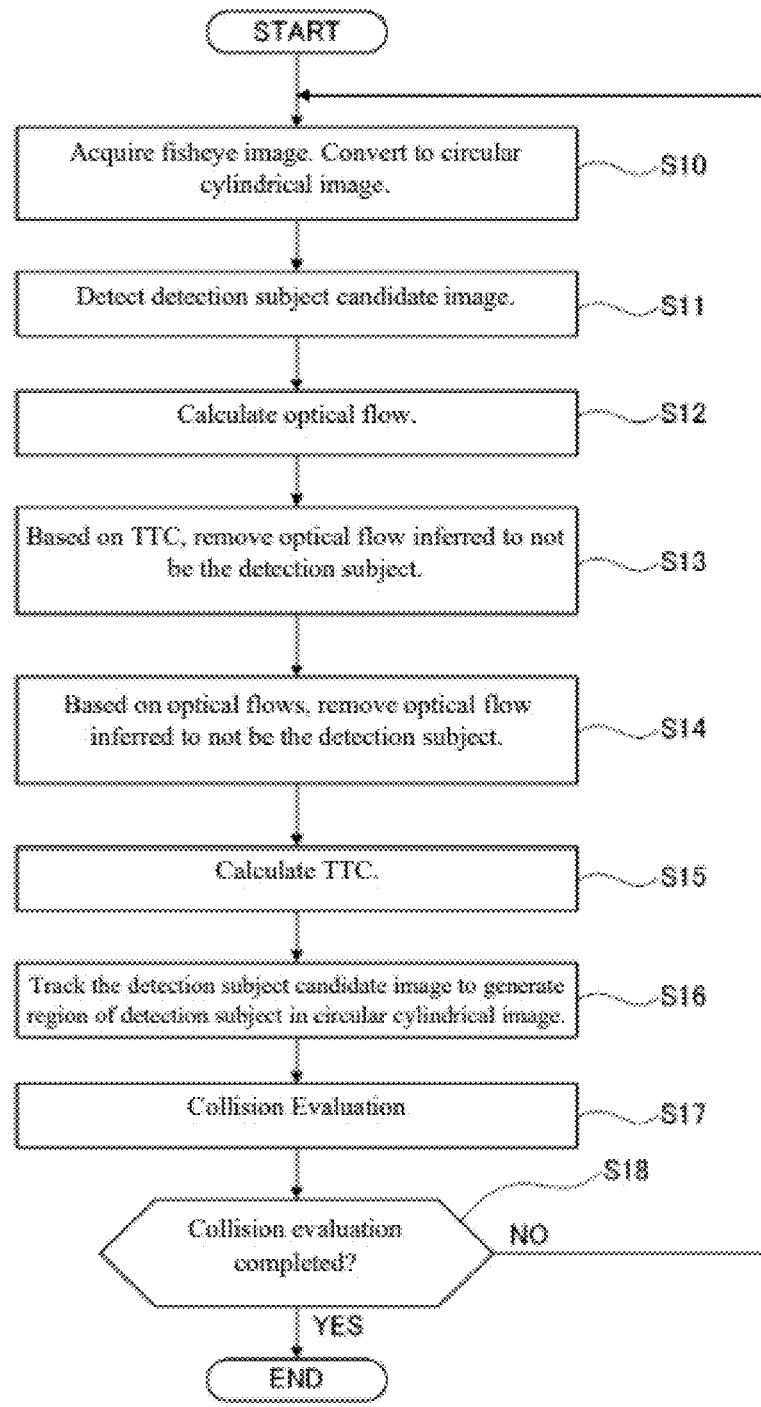

OBSTACLE DETECTION DEVICE

FIELD OF TECHNOLOGY

The present invention relates to an optical detecting device.

PRIOR ART

There are optical detecting devices for determining the risk of collision between a vehicle and a moving object (for example, a person) (referencing, for example, Patent Document 1).

Patent Document 1 discloses a surroundings recognizing device for setting, in an image captured by a camera sensor mounted on a vehicle, a first region that depends on the vehicle width of the front of the vehicle and a travel path of the vehicle, and setting a second region depending on the relative speed of the moving object and the travel path of the vehicle, to the left and right of the first region, to carry out a process for detecting a moving object through pattern matching in the first region, and to carry out a process for detecting an optical flow of the moving object in the second region. This reduces the processing load and processing time of the surroundings identifying device, and detects moving objects accurately.

PRIOR ART DOCUMENTS

Patent Documents

Patent Document 1: Japanese Unexamined Patent Application Publication 2010-93610

SUMMARY OF THE INVENTION

Problem Solved by the Present Invention

However, in the structure set forth in Patent Document 1, a pattern matching process is carried out that compares feature quantities that correspond to moving objects based on a plurality of object shape patterns that are stored in advance, so there is a problem in that the moving object cannot be detected, and the collision evaluation cannot be performed, in a state wherein it is not possible to capture a complete image of the detection subject with the camera.

Given this, the object of the present invention is to provide an obstacle detecting device wherein collision evaluation is possible even in a state wherein the camera has not captured a complete image of the detection subject.

Means for Solving the Problem

In order to achieve the object set forth above, an object detecting device according to the present invention comprises: an image converting portion for converting, into a circular cylindrical image, an image captured by a camera installed on a vehicle; a detection subject candidate image detecting portion for detecting a detection subject candidate image through pattern matching; an optical flow calculating portion for calculating an optical flow; an outlier removing portion for removing an optical flow that is not a detection subject; a TTC calculating portion for calculating a TTC; a tracking portion for generating a region of the detection subject on the circular cylindrical image by tracking the detection subject candidate; and a collision evaluating portion for evaluating whether or not there is the risk of a collision, wherein the optical flow calculating portion calculates the optical flow based on the detection subject candidate image and the region.

Effects of the Invention

The object detecting device according to the present invention, structured in this way, is able to perform collision evaluation in a state wherein a complete image of the detection subject has not been captured.

BRIEF DESCRIPTIONS OF THE DRAWINGS

FIG. 1 is a block diagram depicting a system configuration for an obstacle detecting device in a first embodiment.

FIG. 2A is a diagram for explaining an image converting portion of the first embodiment, a diagram showing a fisheye view.

FIG. 2B is a diagram for explaining the image converting portion of the first embodiment, a diagram for explaining a method for converting into a circular cylindrical image.

FIG. 2C is a diagram for explaining the image converting portion of the first embodiment, a diagram showing a circular cylindrical image.

FIG. 3 is a diagram for explaining a detection subject candidate image detecting portion in the first embodiment.

FIG. 4A is a diagram for explaining an optical flow calculating portion of the first embodiment, a diagram for explaining extraction of feature points.

FIG. 4B is a diagram for explaining an optical flow calculating portion of the first embodiment, a diagram for explaining calculation of optical flows based on feature points.

FIG. 5 is a diagram for explaining a region for calculating optical flows in the first embodiment.

FIG. 6 is a diagram for explaining a first outlier removing portion in the first embodiment.

FIG. 7 is a diagram for explaining a first outlier removing portion in the first embodiment.

FIG. 8 is a diagram for explaining a first outlier removing portion in the first embodiment.

FIG. 9 is a diagram for explaining a second outlier removing portion in the first embodiment.

FIG. 10 is a diagram for explaining a TTC calculating portion in the first embodiment.

FIG. 11A is a diagram for explaining a TTC calculating portion in the first embodiment.

FIG. 11B is a diagram for explaining a TTC calculating portion in the first embodiment.

FIG. 12 is a diagram for explaining a TTC calculating portion in the first embodiment.

FIG. 13 is a diagram for explaining a tracking portion in the first embodiment.

FIG. 14 is a diagram for explaining a tracking portion in the first embodiment.

FIG. 15 is a diagram for explaining a collision evaluating portion in the first embodiment.

FIG. 16 is a flowchart showing the flow of processes in the obstacle detecting device in the first embodiment.

FORMS FOR CARRYING OUT THE PRESENT INVENTION

Below, an embodiment for achieving an optical detecting device according to the present invention will be explained based on a first embodiment, shown in the drawings. In the first embodiment, the explanation will be for a vehicle wherein a fisheye camera is mounted as a camera for capturing images toward the rear of the vehicle. In the first embodiment, the explanation will be for an example wherein the detection subject, to be detected by the obstacle detecting device, is a pedestrian.

Embodiment 1

[System Configuration of Obstacle Detecting Device]

FIG. 1 is a block diagram depicting a system configuration for an obstacle detecting device in a first embodiment. FIG. 2A is a diagram for explaining an image converting portion of the first embodiment, a diagram showing a fisheye view. FIG. 2B is a diagram for explaining the image converting portion of the first embodiment, a diagram for explaining a method for converting into a circular cylindrical image. FIG. 2C is a diagram for explaining the image converting portion of the first embodiment, a diagram showing a circular cylindrical image. FIG. 3 is a diagram for explaining a detection subject candidate image detecting portion in the first embodiment. FIG. 4A is a diagram for explaining an optical flow calculating portion of the first embodiment, a diagram for explaining extraction of feature points. FIG. 4B is a diagram for explaining an optical flow calculating portion of the first embodiment, a diagram for explaining calculation of optical flows based on feature points. FIG. 5 is a diagram for explaining a region for calculating optical flows in the first embodiment. FIG. 6 through FIG. 8 are diagrams for explaining a first outlier removing portion in the first embodiment. FIG. 9 is a diagram for explaining a second outlier removing portion in the first embodiment. FIG. 10 through FIG. 12 are diagrams for explaining a TTC calculating portion in the first embodiment. FIG. 13 and FIG. 14 are diagrams for explaining a tracking portion in the first embodiment. FIG. 15 is a diagram for explaining a collision evaluating portion in the first embodiment. A system structure for an obstacle detecting device according to a first embodiment will be explained below.

As illustrated in FIG. 1, the obstacle detecting device 20 processes a fisheye image as an image inputted from a camera that is a fisheye camera 11 and outputs to a notifying device 12 and to a brake 13.

The fisheye camera 11 is attached to a back portion of the vehicle (for example, the rear bumper) to capture an image of a broad range to the rear of the vehicle. The fisheye image captured by the fisheye camera 11 is inputted into the obstacle detecting device 20. Note that the fisheye camera 11 may be a camera with a wide-angle lens.

The obstacle detecting device 20 comprises: an image converting portion 21; a detection subject candidate image detecting portion 22; an optical flow calculating portion 23; a first outlier removing portion 24, as an outlier removing portion; a second outlier removing portion 25, as an outlier removing portion; a TTC calculating portion 26; a tracking portion 27, and a collision evaluating portion 28.

(Image Converting Portion)

The image converting portion 21 acquires a fisheye image P1 shown in FIG. 2A. The image converting portion 21 estimates distortion information and attachment location information for the camera using a calibration technique (for example, the Zhang technique). The image converting portion 21 uses the estimated information to convert the fisheye image P1 into a circular cylindrical image P2, as depicted in FIG. 2C.

The circular cylindrical image P2, as depicted in FIG. 2B, is an image wherein the fisheye image P1 is projected onto a semicircular cylinder S that is perpendicular to the surface of the road. A circular cylindrical image P2 is an image wherein the fisheye image P1 has been converted so that, of the lines in the fisheye image P1, the lines that, in real space, correspond to straight lines that extend in the vertical direction will be straight up, extending straight in the perpendicular direction. Converting to the circular cylindrical image P2 makes it easier to extract information from the circular cylindrical image P2.

(Detection Subject Candidate Calculating Portion)

The detection subject candidate image detecting portion 22, as illustrated in FIG. 3, detects a detection subject candidate image 32, which is an image of a candidate (detection subject candidate) 31A of a detection subject (for example, a pedestrian) 31 through pattern matching based on the circular cylindrical image P2. That is, the detection subject candidate image detecting portion 22 detects the detection subject candidate image 32 in the circular cylindrical image P2 through pattern matching.

The detection subject candidate image 32 may be defined as a rectangular region surrounding a detection subject candidate 31A. The pattern matching is a method for specifying that a specific pattern exists within an image, and may use, for example, matching through machine learning or block matching, or the like.

(Optical Flow Calculating Portion)

The optical flow calculating portion 23 calculates an optical flow based on the detection subject candidate image 32 and a region 32B on the circular cylindrical image P2 of a detection subject 31, described below. An "optical flow" is a vector that connects, on an image, a pair of identical objects in two images that were taken at different times in a time series. That is, the optical flow calculating portion 23 calculates how a region of a detection subject candidate 31A (a detection subject candidate image 32) in the images has moved from a given time to the next time.

When a detection subject candidate image detecting portion 22 has detected a detection subject candidate image 32 in a circular cylindrical image P2 at a time T through pattern matching, the optical flow calculating portion 23 extracts, from the detection subject candidate image 32 in the circular cylindrical image P2 at time T, feature points 33 that are distinctive features, through, for example, Harris, ORB, or the like, as depicted in FIG. 4A.

A feature point 33 is a prominent point that can be detected in an image, and may be, for example, an elbow portion 33a, a hand portion 33b, or a foot portion 33c of the detection subject candidate 31A. At this time, the optical flow calculating portion 23 may extract also feature points 33 from other than the detection subject candidate 31A. Rocks, or the like, on the road surface may also be considered for feature points 33 other than the detection subject candidate 31A.

The optical flow calculating portion 23, as depicted in FIG. 4B, calculates the optical flows 35 through, for example, defining correspondences between feature points 33 of a circular cylindrical image P2 at a time T and those feature points 33 that are similar, among the feature points 33 of a circular cylindrical image P2 at a time T−1, which is one earlier (in the past), through, for example, the LK method or KNN matching.

Specifically, the optical flow calculating portion 23 calculates an optical flow 35a through defining correspondence between an elbow portion 33a of a circular cylinder image P2 at the time T and an elbow portion 33a of the circular cylinder image P2 at the time T−1 that is one earlier. Additionally, the optical flow calculating portion 23 calculates an optical flow 35b through defining correspondence between a hand portion 33b of a circular cylinder image P2 at the time T and a hand portion 33b of the circular cylinder image P2 at the time T−1 that is one earlier. Additionally, the optical flow calculating portion 23 calculates an optical flow 35c through defining correspondence between a foot portion 33c of a circular cylinder image P2 at the time T and a foot portion 33c of the circular cylinder image P2 at the time T−1 that is one earlier.

When the tracking portion 27 described below, together with FIG. 14, has generated a region 32B on the circular cylinder image P2 of the detection subject 31 at time T based on the detection subject candidate image 32 at time T−1, the optical flow calculating portion 23 extracts the feature points 33 that are distinctive features, through, for example, Harris, ORB, or the like, from the detection subject candidate image 32 in the circular cylinder image P2 at time T−1, which is one earlier.

The optical flow calculating portion 23 calculates the optical flows 35 by defining correspondence between the feature points 33 of the circular cylinder image P2 at the time T−1 that is one earlier (in the past) and those feature points 33 that are similar, among the feature points 33 of the circular cylinder image P2 at time T, through, for example, the LK method or KNN matching.

As illustrated in FIG. 5, the optical flow calculating portion 23 sets a region for calculating optical flows 35 based on the detection subject candidate image 32 and the region 32B on the circular cylinder image P2 of the detection subject 31, described below.

Specifically, if, through pattern matching, the detection subject candidate image detecting portion 22 has detected a detection subject candidate image 32 within the circular cylinder image P2 at time T and the tracking portion 27, described below, has generated a region 32B in the circular cylinder image P2 of the detection subject 31 at time T based on the detection subject candidate image 32 at time T−1, the optical flow calculating portion 23 calculates optical flows 35 from time T toward time T−1.

In this case, the region for which the optical flow calculating portion 23 is to calculate the optical flows 35, that is, the region from which feature points 33 are extracted, is a region where the region that combines a pattern matching region and a forecasting region is a rectangle.

The pattern matching rectangle is a detection subject candidate image 32 observed at time T. The forecasting rectangle is a region 32B on the circular cylinder image P2 of the detection subject 31 at time T, generated based on the detection subject candidate image 32 at time T−1.

If the detection subject candidate image detecting portion 22 has detected a detection subject candidate image 32 in the circular cylinder image P2 at time T through pattern matching and the tracking portion 27, described below, has not generated a region 32B on the circular cylinder image P2 of the detection subject 31 at time T based on the detection subject candidate image 32 at time T−1, the optical flow calculating portion 23 calculates the optical flows 35 from time T toward time T−1.

In this case, the region for which the optical flow calculating portion 23 will calculate the optical flows 35, that is, the region for which the feature points 33 will be extracted, will be the pattern matching rectangle.

If the tracking portion 27, described below, has generated a region 32B on the circular cylinder image P2 of the detection subject 31 at time T based on the detection subject candidate image 32 at time T−1, without the detection subject candidate image detecting portion 22 having detected a detection subject candidate image 32 in the circular cylinder image P2 at time T through pattern matching, the optical flow calculating portion 23 will calculate the optical flows 35 from time T toward time T−1.

In this case, the region for which the optical flow calculating portion 23 will calculate the optical flows 35, that is, the region for which the feature points 33 will be extracted, will be the tracking rectangle. The tracking rectangle is a pattern matching rectangle observed at time T−1.

If the detection subject candidate image detecting portion 22 has not detected a detection subject candidate image 32 in the circular cylinder image P2 at time T through pattern matching and the tracking portion 27, described below, has not generated a region 32B on the circular cylinder image P2 of the detection subject 31 at time T based on the detection subject candidate image 32 at time T−1, the optical flow calculating portion 23 will calculate no optical flow 35.

In this way, the optical flow calculating portion 23 calculates the optical flows 35 based on the region 32B of the circular cylinder image P2 of the detection subject 31, extracted through tracking the detection subject candidate image 32 that was initially detected, and the detection subject candidate image 32 for which pattern matching was successful again.

(First Outlier Removing Portion)

The first outlier removing portion 24 removes any optical flow that is inferred to not be a detection subject, based on TTCs calculated based on the optical flow 35 calculated by the optical flow calculating portion 23. That which is not a detection subject is, for example, the background, or the like. The first outlier removing portion 24 uses a dividing line M to divide the results of a plurality of optical flows 35, as illustrated in FIG. 6, into a top group G1 that is above a dividing line M, and a bottom group G2, that is below the dividing line M, dividing the number of optical flows 35 in half, in the vertical direction of the circular cylinder image P2.

The first outlier removing portion 24 selects one optical flow 35 of the top group G1 and one optical flow 35 of the bottom group G2, to calculate the TTCs (times-to-collision) between the fisheye camera 11 and the detection subject candidate 31A.

The case of measuring the distances from the head and the foot, for example, will be explained referencing FIG. 7. A direction θ (elevation angle) of the head is calculated either by the coordinates at the top of the rectangle of the detection result or by a method that uses images, such as optical flows.

As illustrated in FIG. 7, the TTC of the two locations is calculated through the following equations:

$$\tan \theta_H(t) = (Hp - H(t) - Hc)/L$$

$$\tan \theta_L(t) = H(t)/L$$

$$H(t) = L \tan \theta L(t)$$

$$\tan \theta_H(t+\Delta t) = (Hp - H(t+\Delta t) - Hc)/(L - (Vc + Vp)\Delta t)$$

$$\tan \theta_L(t+\Delta t) = H(t+\Delta t)/(L - (Vc + Vp)\Delta t)$$

$$H(t+\Delta t) = (L - (Vc + Vp)\Delta t) \cdot \tan \theta L$$

Because there are five unknowns and four equations, is not possible to calculate all unknowns.

TTC is calculated rather than calculating all of the unknowns individually.

$$TTC = L/(Vc+Vp)$$

$$TTC(t) = \Delta t \cdot \{\tan \theta H(t+\Delta t) - \tan \theta L(t+\Delta t)\} / \{\tan \theta H(t) - \tan \theta L(t) - \tan \theta H(t+\Delta t) + \tan \theta L(t+\Delta t)\} - \Delta t \quad \text{[Formula 1]}$$

The parameters are given below:
Hc: Camera height
Hp: Pedestrian height (unknown value)
H(t), H(t+Δt): height of foot a times t and t+Δt (unknown values)
Vc: Camera speed (=vehicle velocity)
Vp: Pedestrian speed (unknown value)
L: Distance at time t (unknown value)
$\theta_H(t)$, $\theta_H(t+\Delta t)$: Directions of head of pedestrian and at times t+Δt
$\theta_L(t)$, $\theta_L(t+\Delta t)$: Directions of leg of pedestrian and at times t+Δt In this way, the first outlier removing portion 24 calculates the TTCs for all combinations of the optical flows 35 of the top group G1 and the optical flows 35 of the bottom group G2.

The first outlier removing portion 24 generates a TTC array by placing the calculated TTCs in an array. The first outlier removing portion 24 extracts the TTCs of a region E wherein the frequency is high, as illustrated in FIG. 8, as in the below, based on the TTC array.
1. Iterate 2 through 4 four times with i=0 through 3.
2. Calculate the median of the TTC array (mid_TTC).
3. Through the below, discard, from the various elements (items) in the TTC array, those which have a large error proportion from the median, as in the below:
   ((item−mid_ttc)/mid_ttc)·abs>0.8: when i==0
   ((item−mid_ttc)/mid_ttc)·abs>0.4: when i==1
   ((item−mid_ttc)/mid_ttc)·abs>0.2: when i==2
   ((item−mid_ttc)/mid_ttc)·abs>0.1: when i==3
4. Return to 2.
5. Extract the optical flows 35 from the remaining TTC array and use in the TTC calculations.

In this way, the first outlier removing portion 24 removes optical flows 35 that are used in TTCs outside of the high-frequency region E, based on a plurality of TTCs. This makes it possible to define, as the overall movement of the detection subject 31, those parts that are moving similarly. That is, the first outlier removing portion 24, based on the distribution of TTCs between the fisheye camera 11 and the detection subject candidate 31A, removes those optical flows 35 that are inferred as not being the detection subject 31.

(Second Outlier Removing Portion)

The second outlier removing portion 25 removes those optical flows that, based on the optical flows 35 calculated by the optical flow calculating portion 23, are inferred as not being a detection subject. The optical flows 35 on the circular cylindrical image P2 have linearity with respect to the location on the circular cylindrical image P2.

FIG. 9 (a) shows optical flows 35 calculated by the optical flow calculating portion 23. Here the optical flows 35 that have been calculated are depicted as a first optical flow 35e, a second optical flow 35f, a third optical flow 35g, a fourth optical flow 35h, a fifth optical flow 35i, and a sixth optical flow 35j.

The second outlier removing portion 25 divides the optical flows 35, calculated by the optical flow calculating portion 23, into the horizontal components in the horizontal direction u and vertical components in the vertical direction v.

The optical flows 35 of the horizontal components, as depicted in FIG. 9 (b), are depicted as a first optical flow 35eu, a second optical flow 35fu, a third optical flow 35gu, a fourth optical flow 35hu, a fifth optical flow 35iu, and a sixth optical flow 35ju.

In the second outlier removing portion 25, the optical flows 35 of the horizontal component form a graph that shows the relationships between the X-coordinate [pixel] in the horizontal direction u and the flow lengths of the optical flows 35 of the horizontal components, as depicted in FIG. 9 (d). The second outlier removing portion 25 calculates a horizontal component approximation line Lu, as a linear approximation, based on the graph indicating the relationships between the X-coordinate [pixel] of the horizontal direction u and the flow lengths of the optical flows 35 in the horizontal direction. The horizontal component approximation line Lu is a straight line that passes through many points of the optical flows 35, or through the vicinities of these points.

In the second outlier removing portion 25, the first optical flow 35eu, the third optical flow 35gu, the fourth optical flow 35hu, and the fifth optical flow 35iu, for which the residuals from the horizontal component approximation line Lu are small in the horizontal direction u, will remain, as depicted in FIG. 9 (f). That is, the second outlier removing portion 25 will remove the second optical flow 35fu and sixth optical flow 35ju, which are outliers from the horizontal component approximation line Lu.

The optical flows 35 of the vertical components, as depicted in FIG. 9 (c), are depicted as a first optical flow 35ev, a second optical flow 35fv, a third optical flow 35gv, a fourth optical flow 35hv, a fifth optical flow 35iv, and a sixth optical flow 35jv.

In the second outlier removing portion 25, the optical flows 35 of the vertical component form a graph that shows the relationships between the Y-coordinate [pixel] in the vertical direction v and the flow lengths of the optical flows 35 of the vertical components, as depicted in FIG. 9 (e). The second outlier removing portion 25 calculates a vertical component approximation line Lv, as a linear approximation, based on the graph indicating the relationships between the Y-coordinate [pixel] of the vertical direction v and the flow lengths of the optical flows 35 in the vertical direction. The vertical component approximation line Lv is a straight line that passes through many points of the optical flows 35, or through the vicinities of these points.

In the second outlier removing portion 25, the first optical flow 35ev, the third optical flow 35gv, the fourth optical flow 35hv, and the sixth optical flow 35jv, for which the residuals from the vertical component approximation line Lv are small in the vertical direction v, will remain, as depicted in FIG. 9 (f). That is, the second outlier removing portion 25 will remove the second optical flow 35fv and fifth optical flow 35iv, which are outliers from the horizontal component approximation line Lu.

The second outlier removing portion 25 uses the optical flows 35 that match among the optical flows 35 that remain in the horizontal direction u and the optical flows 35 that remain in the vertical direction v. These matching optical flows 35 are the first optical flow 35e, the third optical flow 35g, and the fourth optical flow 35h.

That is, the second outlier removing portion 25 removes, as outlier values, those optical flows 35 that are far from the approximation line, based on the optical flows calculated by the optical flow calculating portion 23 and based on the relationships between the flow lengths and the coordinates for the optical flows 35.

(TTC Calculating Portion)

Based on each of the optical flows 35 from which the outliers have been removed, the TTC calculating portion 26, as depicted in FIG. 10, calculates the relative distances $L_{pi}$, in a past location, between the detection subject 31 and the fisheye camera 11 that is installed on the vehicle 10, the relative distances $L_{ci}$, in the current location, between the detection subject 31 and the fisheye camera 11 that is installed on the vehicle 10, and the relative velocities $V_x$, $V_y$, and $V_z$.

In FIG. 11A, FIG. 11B, and FIG. 12, the definitions of coordinate system angles are as below:

$$x = L \cdot \cos\theta \cos\varphi$$

$$y = L \cdot \cos\theta \sin\varphi$$

$$z = L \cdot \sin\theta$$

Unknown values: 2N+3 (wherein N is the number of points)

$L_{pi}$: Distance between the past location Pi and the fisheye camera 11

$L_{ci}$: Distance between the current location Pi and the fisheye camera 11

$V_x$, $V_y$, $V_z$: Relative movement velocities of the detection subject 31.

Note that the velocities of all of the points can be considered to be identical by assuming that the detection subject 31 is a rigid body.

Known values: Can be calculated from the fisheye camera geometry and the optical flows 35

$\varphi_{pi}$: Past position Pi bearing angle
$\theta_{pi}$: Past position Pi elevation angle
$\varphi_{ci}$: Current position Pi bearing angle
$\theta_{ci}$: Current position Pi elevation angle The TTC calculating portion 26 uses the equations below to calculate the relative distances $L_{pi}$ at the past location between the detection subject 31 and the fisheye camera 11 that is installed on the vehicle 10, the relative distances $L_{ci}$ at the current location between the detection subject 31 and the fisheye camera 11 that is installed on the vehicle 10, and the relative velocities $V_x$, $V_y$, and $V_z$.

$$x_{ci} = x_{pi} + v_x dt$$

$$y_{ci} = y_{pi} + v_y dt$$

$$z_{ci} = z_{pi} + v_z dt$$

$$L_{ci} \cos\theta_{ci} \cos\varphi_{ci} = L_{pi} \cos\theta_{pi} \cos\varphi_{pi} + V_x dt$$

$$L_{ci} \cos\theta_{ci} \sin\varphi_{ci} = L_{pi} \cos\theta_{pi} \sin\varphi_{pi} + V_y dt$$

$$L_{ci} \sin\theta_{ci} = L_{pi} \sin\theta_{pi} + V_z dt$$

In the equations above, there is a number (N) of optical flows 35. Variables to be calculated: ($L_{p1}$ through $L_{pN}$, $L_{c1}$ through $L_{cN}$, $V_x$, $V_y$, $V_z$)

However, in this state there will be solutions wherein all values are zero, due to the effect of indefinite scale, and thus the values are redefined by dividing by $V_x$. In the first embodiment, the application is that of obstacle detection when the vehicle is traveling, and thus speeds that are nonzero in the direction in which the vehicle 10 is traveling (the X axis) are subject to detection.

Variables to be calculated: ($L_{p1}/V_x$ through $L_{pN}/V_x$, $L_{c1}/V_x$ through $L_{cN}/V_x$, 1, $V_y/V_x$, $V_z/V_x$)

1 is a constant, so is excluded. This is defined as L', V'.

Variables to be calculated: $L'_{p1}$ through $L'_{pN}$, $L'_{c1}$ through $L'_{cN}$, $V'_y$, $V'_z$): 2N+2 variables Equations: 3N equations A solution can be found if N is no less than 2. This can be solved through a system of equations using the least-squares method (using a pseudo-inverted matrix).

<Calculation of the Solution Using the Least-Squares Method (using a Pseudo-inverse Matrix)>

$$AX = P$$

$$X = A^+ P = (A^* A)^{-1} A^* P$$

$A^+$: Pseudo-inverted matrix
$A^*$: Transposed matrix
$A^{-1}$: inverse matrix $$A = \begin{pmatrix} -\sin\varphi_{c1}\cos\theta_{c1} & 0 & \ldots & 0 & \sin\varphi_{p1}\cos\theta_{p1} & 0 & \ldots & 0 & dt & 0 \\ -\cos\varphi_{c1}\cos\theta_{c1} & 0 & \ldots & 0 & \cos\varphi_{p1}\cos\theta_{p1} & 0 & \ldots & 0 & 0 & 0 \\ -\sin\theta_{c1} & 0 & \ldots & 0 & \sin\theta_{p1} & 0 & \ldots & 0 & 0 & dt \\ 0 & -\sin\varphi_{c2}\cos\theta_{c2} & \ldots & 0 & 0 & \sin\varphi_{p2}\cos\theta_{p2} & \ldots & 0 & dt & 0 \\ 0 & -\cos\varphi_{c2}\cos\theta_{c2} & \ldots & 0 & 0 & \cos\varphi_{p2}\cos\theta_{p2} & \ldots & 0 & 0 & 0 \\ 0 & -\sin\theta_{c2} & \ldots & 0 & 0 & \sin\theta_{p2} & \ldots & 0 & 0 & dt \\ \vdots & \vdots & \ddots & \vdots & \vdots & \vdots & \ddots & \vdots & \vdots & \vdots \\ 0 & 0 & \ldots & -\sin\varphi_{cN}\cos\theta_{cN} & 0 & 0 & \ldots & \sin\varphi_{pN}\cos\theta_{pN} & dt & 0 \\ 0 & 0 & \ldots & -\cos\varphi_{cN}\cos\theta_{cN} & 0 & 0 & \ldots & \cos\varphi_{pN}\cos\theta_{pN} & 0 & 0 \\ 0 & 0 & \ldots & -\sin\theta_{cN} & 0 & 0 & \ldots & \sin\theta_{pN} & 0 & dt \end{pmatrix}$$

$$P = \begin{pmatrix} 0 \\ -dt \\ 0 \\ 0 \\ -dt \\ 0 \\ \vdots \\ 0 \\ -dt \\ 0 \end{pmatrix} \quad \text{[Formula 3]}$$

$$X = \begin{pmatrix} L'_{c1} \\ L'_{c2} \\ \vdots \\ L'_{cN} \\ L'_{p1} \\ L'_{p2} \\ \vdots \\ L'_{pN} \\ v'_y \\ v'_z \end{pmatrix} \quad \text{[Formula 4]}$$

While a solution X can be found using the least-squares method, $V_x$ remains as an unknown value for the variable, so here everything is calculated as the ratio with Vx, so L, $V_y$, and $V_z$ cannot be calculated.

<Calculation of TTCX and TTCY>

$TTCX_i = xp_i/V_x$ $TTCY_i = yp_i/V_y$ $TTCX_i = L_{ci} \cos \theta_{ci} \cos \varphi_{ci}/V_x$ $TTCY_i = L_{ci} \cos \theta_{ci} \sin \varphi_{ci}/V_y$ $L'_{ci} = L_{ci}/V_x$ $V'_y = V_y/V_x$ $TTCX_i = L'_{ci} \cos \theta_{ci} \cos \varphi_{ci}/V'_x$ $TTCY_i = L'_{ci} \cos \theta_{ci} \sin \varphi_{ci}$ $L'_{ci}$ and $V'_y$, can be calculated as solutions, enabling calculation of TTCX and TTCY. While TTCXs and TTCYs are calculated in plurality for the number of flows, the final values are defined as the means of all of the TTC calculation results.

In this way, the TTC calculating portion 26 calculates the relative distance between the detection subject 31 and the fisheye camera 11 that is installed on the vehicle 10, and calculates the relative speed therebetween, based on the optical flows 35 from which the outlier values have been removed, and, as depicted in FIG. 12, calculates TTCX and TTCY, which are components in two directions. TTCX is the TTC component in the direction in which the vehicle 10 is traveling. TTCY is the TTC component in the perpendicular direction that is perpendicular to the direction in which the vehicle 10 is traveling.

(Tracking Portion)

The optical flows for which the outlier removing portions (the first outlier removing portion 24 and the second outlier removing portion 25) have removed the outlier values are defined as optical flows 35A through 35E. As depicted in FIG. 13, the tracking portion 27 selects, from the optical flows 35A through 35E, the optical flow 35C that is positioned halfway from the optical flow 35A at the top end. Note that the tracking portion 27 may instead select the optical flow 35C that is positioned halfway from the optical flow 35E on the bottom end.

The tracking portion 27 defines a selected optical flow 35C as a translational vector of a rectangle that includes the detection subject 31. The tracking portion 27 calculates the scale using the formula below.

<Definition of the Location, Relative to the $n^{th}$ Flow, Among N Flows>

Image coordinates at time T−1: Xs(n), Ys(n)

Image coordinates at time T: Xe(n), Ye(n)

<Translational Vectors>

Assume that the optical flows 35A through 35E are sorted by the values of the image Y coordinates. The optical flow 35C, which is near the center, is used as-is as the translational vector.

transXs=Xs(N/2), transYs=Ys(N/2)

transXe=Xe(N/2), transYe=Ye(N/2)

<Scale>

$$\text{Scale} = \sum_{n=1}^{N} \frac{\sqrt{\left(Xe(n) - Xe\left(\frac{N}{2}\right)\right)^2 + \left(Ye(n) - Ye\left(\frac{N}{2}\right)\right)^2}}{(N-1)\sqrt{\left(Xs(n) - Xs\left(\frac{N}{2}\right)\right)^2 + \left(Ys(n) - Ys\left(\frac{N}{2}\right)\right)^2}} \quad \text{[Formula 5]}$$

Note here that n=N/2 is skipped, so this is the mean of N−1 values.

That is, the scale is the average ratio of the optical flow 35C that is a translational vector to the lengths of the optical flows 35A, 35B, 35D, and 35E for which outlier values were removed. For example, explaining for the optical flow 35D, the scale is the ratio of the length 35s between starting points, connecting the starting point of the optical flow 35C and the starting point of the optical flow 35D, and the length 35t between ending points, connecting the ending point of the optical flow 35C and the ending point of the optical flow 35D.

The tracking portion 27, as depicted in FIG. 14, uses the detection subject candidate image 32 at time T−1 and the tracking result, along with the translational vector and the scale, to generate the region (tracking rectangle) 32B on the circular cylindrical image P2 of the detection subject 31 at time T, and the estimated image for time T+1. The calculated region 32B on the circular cylindrical image P2 of the detection subject 31 may be used alone where pattern matching is unsuccessful.

(Definition of Coordinate Positions of Tracking Rectangle)

Rectangle apex at T−1: X1 (T−1), Y1 (T−1)

Rectangle apex at T: X1 (T), Y1 (T)

X1, X2, X3, and X4 are defined for the four apexes.

$X1(T) = \text{Scale} * \{X1(T-1) - \text{trans}Xs\} + \text{trans}Xe$ $Y1(T) = \text{Scale} * \{Y1(T-1) - \text{trans}Ys\} + \text{trans}Ye$ In this way, the tracking portion 27 uses the optical flows 35A through 35E for which outlier values were removed to calculate the translational vector component and the scale component, to generate a region (tracking rectangle) 32B on the circular cylindrical image P2 of the detection subject 31 that is the destination in the next frame for the detection subject candidate image (pattern matching rectangle) 32.

That is, based on the optical flows, the tracking portion 27 tracks the detection subject candidate image 32 for the next circular cylindrical image P2, to generate the region 32B on the circular cylindrical image P2 of the detection subject 31.

(Collision Evaluating Portion)

The collision evaluating portion 28 evaluates whether or not there is the risk of a collision between the vehicle 10 and the detection subject 31 based on the TTCX of the travel direction of the vehicle 10 and the TTCY of the perpendicular direction that is perpendicular to the travel direction of the vehicle 10.

As depicted in FIG. 15, there is a detection subject 31 moving toward a line that extends in the travel direction of the vehicle 10.

The collision evaluating portion 28 evaluates that there is a risk of a collision when the formula below is satisfied:

$$TTCY_{b\_near} < TTCX < TTCY_{b\_far}$$

$TTCY_{b\_near}$: TTC to the bumper that is nearest to the detection subject 31

$TTCY_{b\_far}$: TTC to the bumper that is furthest from the detection subject 31

$TTCY_c$: TTC to the extension line of the travel direction of the vehicle 10

TTCX: TTC to the perpendicular line of the travel direction of the vehicle 10.

PosX: Distance from the vehicle 10 to the detection subject 31 in the direction of travel of the vehicle 10

PosY: Distance from the vehicle 10 to the detection subject 31 in the perpendicular direction that is perpendicular to the direction of travel of the vehicle 10.

L: Width of the vehicle 10

For $TTCY_b$, the risk of collision is evaluated based on two different formulas, below, depending on the distance between the vehicle 10 and the detection subject 31.

If PosY>threshold value (for example, 2 m), the following formulas are used:

$$TTCY_{b\_near} = \left(1 - \frac{\frac{L}{2}}{|PosY|}\right) * TTCY_C \quad \text{[Formula 6]}$$

$$TTCY_{b\_far} = \left(1 + \frac{\frac{L}{2}}{|PosY|}\right) * TTCY_C \quad \text{[Formula 7]}$$

If PosY≤threshold value (for example, 2 m), the formulas below are used:

$$TTCY_{b\_near} = \frac{PosY - \frac{L}{2}}{PosY} * TTCY_C \quad \text{[Formula 8]}$$

$$TTCY_{b\_far} = \frac{PosY + \frac{L}{2}}{PosY} * TTCY_C \quad \text{[Formula 9]}$$

In this way, the collision evaluating portion 28 evaluates the range over which TTCX will go to 0 (the collision range) in the period from the detection subject 31 arriving at $TTCY_{b\_near}$ until passing $TTCY_{b\_far}$. That is, the collision evaluating portion 28 evaluates whether or not there is a risk of collision between the vehicle 10 and the detection subject 31 based on $TTCY_{b\_near}$, which is the perpendicular direction component of TTC from the detection subject 31 to the near bumper, and $TTCY_{b\_far}$, which is the perpendicular direction component of TTC from the detection subject 31 to the far bumper.

The obstacle detecting device 20 sends a control signal to the notifying device 12 and the brake 13 depending on the result evaluated by the collision evaluating portion 28.

(Notifying Device)

The notifying device 12 is an image displaying device that displays a warning image if, for example, the collision evaluating portion 28 has evaluated that there is the risk of a collision. The notifying device 12 displays the warning image based on a control signal from the obstacle detecting device 20. Note that the notifying device 12 may also be a warning device that issues a warning tone if the collision evaluating portion 28 has evaluated that there is the risk of a collision.

(Brake)

The brake 13 decelerates or stops the vehicle 10 based on the control signal from the obstacle detecting device 20.

[Obstacle Detecting Device Process Flow]

FIG. 16 is a flowchart showing the flow of processes in an obstacle detecting device 20 according to the first embodiment. The flow of processes in the obstacle detecting device 20 in the first embodiment will be explained below.

As depicted in FIG. 16, the image converting portion 21 acquires the fisheye image P1 and converts the fisheye image P1 into a circular cylindrical image P2 (Step S10).

Following this, the detection subject candidate image detecting portion 22 detects, through pattern matching, a detection subject candidate image 32 in the circular cylindrical image P2 (Step S11).

Following this, the optical flow calculating portion 23 calculates optical flows 35 based on the detection subject candidate image 32 and the region 32B of the detection subject 31 in the circular cylindrical image P2 (Step S12).

The first outlier removing portion 24 next removes optical flows inferred to not be detection subjects, based on the TTCs calculated based on the optical flows 35 that were calculated by the optical flow calculating portion 23 (Step S13).

Following this, the second outlier removing portion 25 removes the optical flows that are inferred not to be detection subjects based on the optical flows 35 calculated by the optical flow calculating portion 23 (Step S14).

Following this, the TTC calculating portion 26 calculates TTCXs and TTCYs, in two directions, by calculating the relative distances and relative speeds between the detection subject 31 and the fisheye camera 11 that is installed on the vehicle 10, based on the optical flows 35 from which outlier values have been removed (Step S15).

Following this, the tracking portion 27 tracts a detection subject candidate image 32 in relation to the next circular cylindrical image P2, based on the optical flows, to generate a region 32B on the circular cylindrical image P2 of the detection subject 31 (Step S16).

Next the collision evaluating portion 28 evaluates whether or not there is the risk of a collision between the vehicle 10 and the detection subject 31, based on the TTCX, in the direction of travel of the vehicle 10, and the TTCY, in the perpendicular direction, that is perpendicular to the direction of travel of the vehicle 10 (Step S17).

Following this, the obstacle detecting device 20 evaluates whether or not the collision evaluation has been completed (Step S18). If the evaluation is that the collision evaluation has not been completed (Step S18: NO), processing returns to Step S10. On the other hand, if the evaluation is that the collision evaluation has been completed, processing by the obstacle detecting device 20 is terminated.

[Operation of the Obstacle Detecting Device]

The operation of the obstacle detecting device 20 according to the first embodiment will be explained below.

The obstacle detecting device 20 according to the first embodiment comprises: an image converting portion 21 for converting a fisheye image P1, captured by a fisheye camera 11 that is installed on a vehicle 10, into a circular cylindrical image P2; a detection subject candidate image detecting portion 22 for detecting a detection subject candidate image 32, through pattern matching, based on the circular cylindrical image P2; an optical flow calculating portion 23 for calculating optical flows 35 based on the detection subject candidate image 32; outlier removing portions (a first outlier removing portion 24 and a second outlier removing portion 25) for removing optical flows 35 inferred, based on the optical flows 35, to not be a detection subject 31; a TTC calculating portion 26 for calculating TTCs (TTCX, TTCY) based on the optical flows 35 that remain, not having been removed by the outlier removing portions (the first outlier removing portion 24 and the second outlier removing portion 25); a tracking portion 27 for tracking the detection subject candidate image 32 in relation to the next circular cylindrical image P2, based on the optical flows 35, to generate a region 32B on the circular cylindrical image P2 of the detection subject 31; and a collision evaluating portion 28 for evaluating whether or not there is the risk of a collision between the vehicle 10 and the detection subject 31 based on the TTCs (TTCX, TTCY), wherein the optical flow calculating portion 23 calculates optical flows 35 based on the detection subject candidate image 32 and the region 32B (FIG. 1).

This makes it possible to generate a region 32B for the detection subject 31 in the circular cylindrical image P2 through pattern matching in a state wherein the detection subject 31 is far, and through detecting the detection subject candidate image 32 in a state wherein the detection subject 31 is not completely reflected onto the circular cylindrical image P2 when the detection subject 31 has neared the vehicle 10. This makes it possible to evaluate whether or not there is the risk of a collision between the vehicle 10 and the detection subject 31 over the entire range from a state wherein the image of the detection subject 31 appears entirely on the circular cylindrical image P2, up through a state wherein only a portion of the detection subject 31 appears in the circular cylindrical image P2.

That is, collision evaluation is possible even in a state wherein the image of the detection subject 31 is not captured entirely by the fisheye camera 11. The result is the ability to perform collision evaluation across the entire scope of far to near for the relative distances between the vehicle 10 and the detection subject 31.

Moreover, the TTC can be calculated directly from the optical flows 35 of the detection subject 31. This enables the TTC to be calculated more accurately. The result is that the collision evaluating portion 28 can perform the evaluation more accurately.

In the obstacle detecting device 20 in the first embodiment, the TTC calculating portion 26 calculates a TTCX for the direction of travel of the vehicle 10 and a TTCY for the perpendicular direction that is perpendicular to the direction of travel of the vehicle 10 (FIG. 12).

This enables an evaluation that there is the risk of collision when the detection subject 31 cuts across the direction of travel of the vehicle 10, and an evaluation that there is no risk of collision if the detection subject 31 does not cross the width of the vehicle 10. The result is the ability to carry out appropriate braking evaluations with respect to a detection subject 31 that nears the vehicle 10 from any of a variety of directions.

In the obstacle detecting device 20 according to the first embodiment, the outlier removing portion (first outlier removing portion 24) removes optical flows 35 that are inferred, based on the TTCs, to not be a detection subject 31 (FIG. 8).

This makes it possible to narrow down the detection subject candidates 31A. This results in a smaller region to process. The result is the ability to reduce the load in the processes up through collision evaluation.

In the obstacle detecting device 20 according to the first embodiment, the outlier removing portion (second outlier removing portion 25) removes optical flows 35 that are inferred, based on optical flows 35, to not be a detection subject 31 (FIG. 9).

This makes it possible to narrow down the detection subject candidates 31A further. This results in an even smaller region to process. The result is the ability to reduce the load in the processes up through collision evaluation.

In the obstacle detecting device 20 according to the first embodiment, the tracking portion 27 generates a region 32B for the detection subject 31 in the circular cylindrical image P2 based on the scale and translational vector calculated based on the optical flows 35 (FIG. 14).

This makes it possible to use the region 32B of the detection subject 31 in the circular cylindrical image P2 even in a state wherein it would not be possible to detect the detection subject candidate image 32 through pattern matching because the entirety of the detection subject 31 is not captured by the fisheye camera 11. The result is the ability to perform collision evaluation for the vehicle 10 and the detection subject 31 even in a state wherein the entirety of the detection subject 31 has not been captured by the fisheye camera 11.

In the obstacle detecting device 20 according to the first embodiment, the collision evaluating portion 28 evaluates whether or not there is a risk of a collision between the vehicle 10 and the detection subject 31 based on $TTCY_{b\_near}$, which is a component in the perpendicular direction of TTC from the detection subject 31 to the near bumper, and $TTCY_{b\_far}$, which is a component in the perpendicular direction of TTC from the detection subject 31 to the far bumper.

This enables the collision evaluation to be carried out depending on the distance between the vehicle 10 and the detection subject 31. This enables greater precision in the collision evaluation.

The obstacle detecting device according to the present invention was explained above based on one embodiment. However, the specific structure is not limited to this embodiment, but rather design changes, additions, and the like, are allowed insofar as they do not deviate from the concepts of the inventions set forth in the individual claims.

In the first embodiment, a pedestrian was used as an illustration of a detection subject 31; however, another mobile body, such as another vehicle, or the like, may be defined as the detection subject.

In the first embodiment, an example was presented wherein the camera was a fisheye camera 11; however, there is no limitation to the camera being a fisheye camera.

In the first embodiment, an example was shown wherein the obstacle detecting device 20 according to the present invention was applied in relation to a fisheye camera 11 that performs imaging to the rear of the vehicle 10; however, the obstacle detecting device according to the present invention may also be applied to a fisheye camera that performs imaging toward the front of the vehicle.

CROSS-REFERENCES TO RELATED APPLICATIONS

The present application claims priority based on Japanese Patent Application 2020-007056, filed with the Japan Patent Office on Jan. 20, 2020, and incorporates the disclosure therein in its entirety in this Specification.

The invention claimed is:

1. An obstacle detecting device, comprising: an image converting portion for converting, into a circular cylindrical image, an image captured by a camera installed on a vehicle;
a detection subject candidate image detecting portion for detecting, through pattern matching, a detection subject candidate image based on the circular cylindrical image;
an optical flow calculating portion for calculating an optical flow based on the detection subject candidate image;
an outlier removing portion for removing an optical flow that is inferred, based on the optical flow, not to be a detection subject;
a TTC calculating portion for calculating a time-to-collision (TTC) based on an optical flow that remains after removal by the outlier removing portion;
a tracking portion for calculating a region of the detection subject on the circular cylindrical image by tracking the detection subject candidate image in relation to a subsequent circular cylindrical image based on the optical flow; and
a collision evaluating portion for determining whether or not there is the risk of collision between the vehicle and the detection subject, based on the TTC, wherein:
the optical flow calculating portion calculates the optical flow based on the detection subject candidate image and the region.

2. The obstacle detecting device set forth in claim 1, wherein:
the TTC calculating portion calculates a component in the direction of travel of the vehicle and a component in the perpendicular direction that is perpendicular to the direction of travel of the vehicle.

3. The obstacle detecting device set forth in claim 1, wherein:
the outlier removing portion removes the optical flow that, based on the TTC, is inferred to not be a detection subject.

4. The obstacle detecting device set forth in claim 3, wherein:
the outlier removing portion removes the optical flow that, based on the optical flow, is inferred to not be a detection subject.

5. The obstacle detecting device set forth in claim 1, wherein:
the tracking portion calculates a region of the detection subject on the circular cylindrical image based on a scale and a translational vector calculated based on the optical flow.

6. The obstacle detecting device set forth in claim 1, wherein:
the collision evaluating portion evaluates whether or not there is a risk of a collision between the vehicle and the detection subject based on the perpendicular direction component of the TTC to the bumper that is near to the detection subject and the perpendicular direction component of the TTC to the bumper that is far from the detection subject.

* * * * *